United States Patent
Shi et al.

(10) Patent No.: US 12,432,157 B2
(45) Date of Patent: Sep. 30, 2025

(54) NETWORK NODE SIMULATION METHOD BASED ON LINUX CONTAINER

(71) Applicant: Xidian University, Xi'an (CN)

(72) Inventors: Yan Shi, Xi'an (CN); Min Sheng, Xi'an (CN); Qixuan Cao, Xi'an (CN); Jiandong Li, Xi'an (CN); Weigang Bai, Xi'an (CN); Di Zhou, Xi'an (CN); Haoran Li, Xi'an (CN); Yan Zhu, Xi'an (CN); Feng Ding, Xi'an (CN); Lianwei Zhou, Xi'an (CN)

(73) Assignee: Xidian University, Xi'an (CN)

(*) Notice: Subject to any disclaimer, the term of this patent is extended or adjusted under 35 U.S.C. 154(b) by 389 days.

(21) Appl. No.: 18/091,369

(22) Filed: Dec. 30, 2022

(65) Prior Publication Data

US 2023/0216806 A1    Jul. 6, 2023

(30) Foreign Application Priority Data

Jan. 4, 2022  (CN) ........................ 202210001737.X
Jun. 17, 2022  (CN) .......................... 202210692183.2

(51) Int. Cl.
| | |
|---|---|
| *H04L 47/62* | (2022.01) |
| *H04B 7/185* | (2006.01) |
| *H04L 41/40* | (2022.01) |
| *H04L 49/90* | (2022.01) |

(52) U.S. Cl.
CPC .............. *H04L 47/62* (2013.01); *H04L 41/40* (2022.05); *H04L 49/90* (2013.01); *H04B 7/18513* (2013.01)

(58) Field of Classification Search
CPC ......... H04L 41/40; H04L 47/62; H04L 49/90; H04L 41/145; H04B 7/18513
See application file for complete search history.

(56) References Cited

U.S. PATENT DOCUMENTS 8,811,408 B2 *  8/2014  Sharma .................. H04L 45/54
                                                 370/235
2014/0122741 A1 *  5/2014  Thubert .................. H04L 45/04
                                                 709/239

\* cited by examiner

*Primary Examiner* — Mahran Y Abu Roumi
(74) *Attorney, Agent, or Firm* — Hemisphere Law, PLLC; Zhigang Ma (57) ABSTRACT

A large-scale network node simulation method based on Linux container is provided, which solves problems of low packet transmission efficiency and multi-thread creation in real-time simulation in a large-scale network scenario. The method includes: scheduling all container nodes in a scenario; managing, by a container node, a dynamic thread through an idle thread management queue, and setting a finite state machine and a function pointer for the dynamic thread; registering, by a source container node, an output queue with a next-hop container node, and informing the next-hop container node to allocate a dynamic thread for receiving and processing the output queue. Packet transmission is realized between the container nodes through data units created in a shared memory. The sending thread and the receiving thread dynamically adjust the number of dynamic threads by checking the state of the output queue.

16 Claims, 3 Drawing Sheets

NETWORK NODE SIMULATION METHOD BASED ON LINUX CONTAINER

TECHNICAL FIELD

The present disclosure relates to the technical field of communication, and in particularly, to a network node simulation method based on Linux container.

DESCRIPTION OF RELATED ART

Network simulation is a new high technology, which uses mathematical modeling and statistical analysis to simulate a behavior of a network, and obtains network performance data required for network design and optimization by establishing statistical models of network devices and network links and simulating the transmission of network traffic. With the development of communication network technology, the network simulation faces several demands and challenges such as a complex topology, a huge scale, a high dynamic, real traffic bearing simulation and hardware-in-the-loop access verification. At present, mainstream network simulation software, such as NS3, OPNET, OMNET, etc., has low real-time performance in packet processing of nodes, and does not have the ability to simulate reality in a large-scale simulation scenario, and cannot verify a real protocol stack of super-large-scale dynamic network nodes.

Chinese patent application with a publication No. CN106059804A (with an application No. CN201610364291.1) proposed a large-scale network simulation method based on improved OPNET-HLA, which is used to solve a technical problem that the existing large-scale network simulation method based on OPNET-HLA cannot realize distributed simulation of network performance parameters. At present, OPNET is the mainstream communication network simulation software. However, if OPNET is used to simulate a large-scale network on a single physical machine, it will face the problem of low efficiency and poor reliability. Although a distributed simulation technology can solve this problem, it further increases a design complexity of a network architecture. Further, because OPNET adopts a simulation mechanism of discrete event-driven, a current network state cannot be obtained in real time. Linux container, as a solution to realize the virtualization of a lightweight operating system, can simulate the data interaction between network nodes in real time, and has a high utilization rate of a system resource, through which a single host can deploy thousands of containers, and the deployment of a single container is between milliseconds and seconds, such that it has strong scalability, and can save costs and meet the requirements of building the large-scale network.

Chinese patent application with a publication No. CN110995561A (with an application No. CN201911241576.6) proposed a virtual network data communication interaction method and system based on Linux container. The method includes: creating a network namespace for container nodes of a virtual network, virtualizing a network card of the container nodes and configures the network namespace to realize the network communication between the container nodes, and binding a boundary node of the virtual network to a host network card by processing the boundary network card, to realize the data connectivity between container nodes of different hosts and between different types of nodes. However, because a container network uses the traditional Transmission Control Protocol (TCP)/Internet Protocol (IP) to communicate, a lot of data tends to be copied, which will reduce the data transmission rate and network throughput especially in a large-scale and high-concurrency scenario, and thus the requirements of high-speed data transmission is not met. In addition, in this method, the link transmission process of data frames can be effectively simulated only by creating a fixed thread for each network link, however, if too many threads are created in the large-scale and high-concurrency scenario, a lot of physical resources will be occupied.

SUMMARY

Objectives of the present disclosure are to propose a large-scale network node simulation method based on a container thread management technology, aiming at the shortcomings of the related art. The present disclosure aims at solving the problems that too many created processing threads in a large-scale network simulation scenario occupy a large amount of extra memory resources, each low-load link using an independent processing thread results in an increase in processing overhead of a central processing unit (CPU), and a large number of data copies in traditional network transmission packets cannot meet the requirements of high-speed data transmission.

A network node simulation method based on Linux container is provided according to an embodiment of the present disclosure, which includes:

step 1, creating each of container nodes in a satellite network scenario;

step 2, creating a data unit for packet transmission between the container nodes in a shared memory of a physical machine, and creating container-level unit management queues respectively corresponding to the container nodes and a machine-level unit management queue in the shared memory of the physical machine, where the machine-level unit management queue includes a machine-level unit supply queue and a machine-level unit recycle queue, and each of the container-level unit management queues includes a container-level unit supply queue and a container-level unit recycle queue;

step 3, creating an output queue for each of the container nodes in the shared memory, where the output queue is lock-free, concurrent, and secure;

step 4, creating an output queue registry in each of the container nodes, where the output queue registry is configured to store information of one or more output queues corresponding to one or more other container nodes that required to be received and processed by the container node, and the output queue registry includes an output queue quantity, an output queue serial number used to uniquely mark a corresponding output queue, and an enqueue packet count;

step 5, allocating and managing, by each of the container nodes, a first dynamic thread according to a task;

step 6, sending, by a source container node, a packet to a destination container node, and determining whether there is a data unit in a container-level unit supply queue of the source container node;

step 7, in a situation that there is no data unit in the container-level unit supply queue of the source container node, obtaining, by the source container node, a data unit from the machine-level unit management queue, supplementing the obtained data unit to the container-level unit supply queue of the source container node;

step 8, in a situation that there is a data unit in the container-level unit supply queue of the source container node, obtaining, by the source container node, a data unit from the container-level unit supply queue of the source container node and filling a packet into the obtained data unit;

step 9, generating, by each of the container nodes, a forwarding table, and determining an output queue, by the source container node or a forwarding container node according to the corresponding generated forwarding table;

step 10, storing, by the source container node or the forwarding container node, an index of the obtained data unit for storing the packet into the determined output queue, and allocating, by a next-hop container node, a second dynamic thread for receiving and processing the packet;

step 11, determining whether the determined output queue is full;

step 12, in a situation that the determined output queue is full, informing, by the source container node or the forwarding container node, the next-hop container node to dynamically schedule multiple threads for receiving and processing the packet;

step 13, in a situation that the determined output queue is not full, writing, by the source container node or the forwarding container node, the index of the obtained data unit for storing the packet into a position of the determined output queue pointed by an enqueue index, and increasing an enqueue packet count of the determined output queue by 1; and obtaining, by the next-hop container node, the packet from the obtained data unit of the determined output queue, including steps 13.1, 13.2, and 13.3:

step 13.1, determining, by the next-hop container node, a position of the packet taken out from the determined output queue;

step 13.2, checking, by the next-hop container node, whether the determined output queue is empty by comparing a dequeue index with a tail index of the determined output queue, performing step 14, in a situation that the determined output queue is empty; and reading the index of the obtained data unit for storing the packet from a position of the determined output queue pointed by the dequeue index, in a situation that the determined output queue is not empty; and step 13.3, looking up, by the next-hop container node, a destination container node serial number contained in simulation parameter information in the obtained data unit, comparing the destination container node serial number with a serial number of the next-hop container node to determine whether the next-hop container node is the destination container node, performing step 15 in a situation that the next-hop container node is the destination container node, and performing step 9 in a situation that the next-hop container node is the destination container node;

step 14, logging off, by the next-hop container node, registration information of the determined output queue, after it is determined that stream interruption is caused on the determined output queue;

step 15, determining, by the destination container node, a container-level unit recycle queue of the destination container node is full;

step 16, in a situation that the container-level unit recycle queue of the destination container node is full, recycling, by the destination container node, the data unit and supplementing the recycled data unit to the machine-level unit management queue;

step 17, in a situation that the container-level unit recycle queue of the destination container node is not full, finishing a transmission process on the data unit, and performing a transmission process on next data unit in a circulating manner, until all data units are processed.

Compared with the related art, the present disclosure has at least following beneficial effects.

Firstly, in the present disclosure, since the thread is dynamically allocated, which can overcomes the shortage of using independent processing threads for packet transmission and processing of each communication link between network nodes in the related art, thereby not only ensuring the effectiveness of packet transmission and processing by the network nodes, but also reducing the occupation of memory resources of a network simulation system and improving the overall performance of the network simulation system.

Secondly, in the present disclosure, since the number of the threads is dynamically adjusted according to a packet stream strength, fewer threads are used to process low-load services on multiple transmission links, thereby solving the problem in the related art that the network nodes use independent processing threads for each low-load packet stream and thus the inter-thread switching overhead is increased, so that the present disclosure reduces the processing overhead of the CPU on the low-load services.

Thirdly, improving the transmission and processing efficiency of packets by the network nodes on the premise of ensuring the concurrent security of multiple traffic flows is the key to improving the performance of network simulation system. Because the present disclosure uses packet transmission mechanism based on data units, the data units are created in an initialization stage of program operation, and a simulation process does not need to use dynamic memory allocation, recycle and copying mechanisms; what is actually transmitted between container node is a descriptor of the data unit, which does not involve the copy of data in the data unit, thus improving the transmission and processing speed of packets. The lock-free-concurrent-security output queues can overcome the deficiency of the related art that the mutual exclusion the threads of the container node leads to insufficient throughput of the network simulation system, so that the present disclosure improves the throughput of the network simulation system.

Fourthly, in the present disclosure, a container-level data unit supplement and recycle mechanism is adopted, which can support multiple container nodes to simultaneously generate and destroy data units, and improve the parallel processing capability of the network simulation system. Further, a machine-level data unit supplement and recycle mechanism is adopted, which can adjust and balance the imbalance of resources of the data units between the container nodes caused by traffic flow transmission, and thus ensures the long-term and high-speed simulation of the network simulation system.

Other aspects and features of the present disclosure will become apparent from the following detailed description with reference to the accompanying drawings. However, it should be understood that this drawing is only designed for the purpose of explanation, not as a limitation of the scope of the disclosure, because reference should be made to the appended claims. It should also be noted that unless otherwise indicated, the drawings are not necessarily drawn to scale, but merely try to conceptually illustrate the structures and processes described herein.

DETAILED DESCRIPTION OF EMBODIMENTS

The present disclosure will be described in further detail below combined with specific embodiments, but embodiments of the present disclosure are not limited thereto.

Aiming to solve the problems that too many created processing threads in a large-scale network simulation scenario occupy a large amount of extra memory resources, each low-load link using an independent processing thread results in an increase in processing overhead of a CPU, and a large number of data copies in traditional network transmission packets cannot meet the requirements of high-speed data transmission, embodiments of the present disclosure propose a large-scale network node simulation method based on Linux container, and a principle of the method is as follows.

In the embodiments of the present disclosure, a processing thread is only allocated to a network node with packet receiving and processing requirement, therefore, under the condition of simulating the speed-limited packet forwarding of network nodes, the total number of threads created in the large-scale network simulation scenario is reduced by times, so that the problem that too many created processing threads in a large-scale network simulation scenario occupy a large amount of extra memory resources is addressed. Further, in the embodiments of the present disclosure, a node dynamically adjusts the number of receiving and processing threads according to a packet flow intensity of an output queue, and reduces the number of receiving and processing threads under the condition that the packet flow intensity processed by the receiving node is low, thereby reducing the thread switching overhead, so that problem of each low-load link using an independent processing thread results in an increase in processing overhead of a CPU is addressed. Moreover, in the embodiments of the present disclosure, a communication mode of sharing memory is adopted, such that messages transmitted between container nodes are stored in a shared memory accessible by all container nodes, data copying is avoided; and two-level data management queue is adopted to manage data units, which reduces the conflict rate of the container nodes applying the data units. In the embodiments of the present disclosure, an output queue, which is of lock-free, concurrent, and security is designed and an atomic statement is used to realize the lock-free concurrency control of multi-input-multi-output streams, thereby reducing the locking overhead of concurrent control of packet transmission of multiple threads, improving the packet transmission efficiency between nodes, and thus solving the problem that the system throughput decreases due to mutual exclusion between processing threads.

Based on the above principle, referring to FIGS. 1 through 4, the embodiments of the present disclosure provide a large-scale network node simulation method based on Linux container. The large-scale network node simulation method based on Linux container includes steps 1 to 17.

Figure 1:
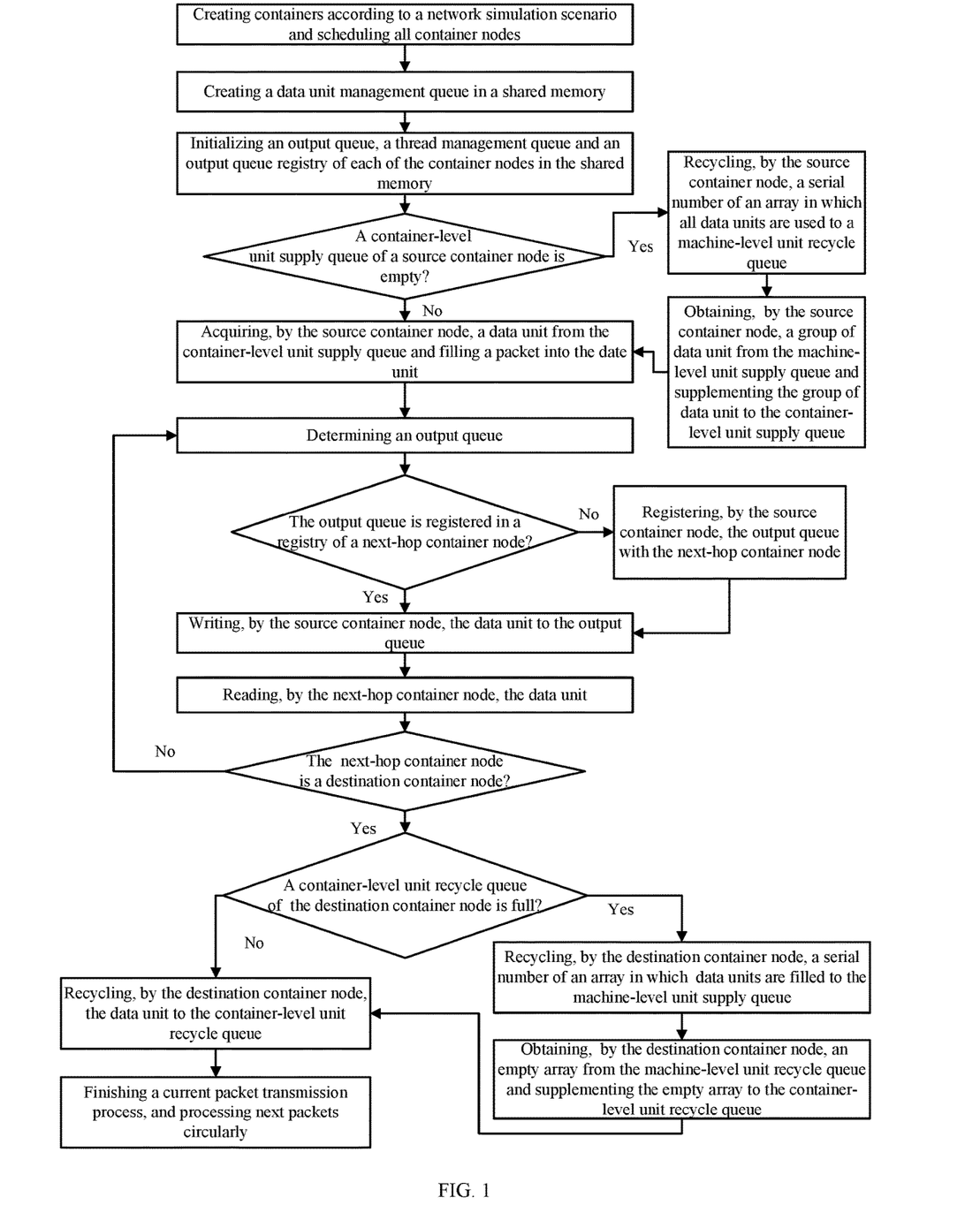
FIG. 1 illustrates a flowchart of a large-scale network node simulation method based on Linux container according to an embodiment of the present disclosure.

In the step 1, each of container nodes in a satellite network scenario are created. The step 1 includes steps 1.1 and 1.2.

In the step 1.1, a container is created according to a configuration of the satellite network scenario.

In the step 1.2, simulation processes of the container nodes are loaded in the container, to complete the creating of each of the container nodes in the satellite network scenario.

The configuration refers to a size of network nodes, a link topology between the network nodes, and traffic flow information. The container is a virtual running environment, the network nodes are satellites in the satellite network scenario, and the simulation processes of the network nodes runs in the container. The container nodes refer to a set of processes with isolated views, limited resources and independent file systems. The Container nodes specifically refer to the simulation processes running in the container and simulating the satellite nodes.

Figure 2:
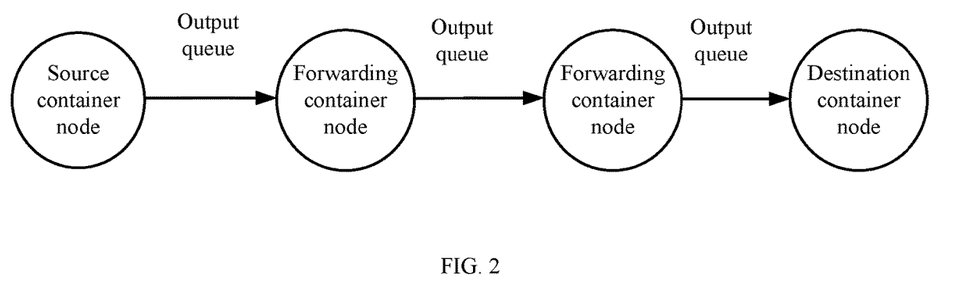
FIG. 2 illustrates a schematic view of data transmission according to an embodiment of the present disclosure.

In the step 2, a data unit management queue is created. Specifically, the data unit used for packet transmission between the container nodes is created in a shared memory of a physical machine, container-level unit management queues respectively corresponding to the container nodes and a machine-level unit management queue are created in the shared memory of the physical machine. The machine-level unit management queue includes a machine-level unit supply queue and a machine-level unit recycle queue, and the container-level unit management queue created for each of the container nodes includes a container-level unit supply queue and a container-level unit recycle queue. The step 2 includes steps 2.1, 2.2 and 2.3.

In the step 2.1, a first array for packet transmission between the container nodes is created in the shared memory of the physical machine, where the first array has a length of N and includes N data units having a fixed size, and N>0. Elements of the first array are the data units having the fixed size. Transferring indexes of the data units in the array between the container nodes can realizes the transmission of packets stored in the data units.

The data units each refer to a structure used to store high-speed transmission data, which is created in the shared memory and used to store simulation parameter information, custom data frame header information, and actual transmitted data.

In the step 2.2, the machine-level unit management queue is created in the shared memory of the physical machine.

Specifically, the machine-level unit management queue created on the physical machine includes the machine-level unit supply queue and the machine-level unit recycle queue, in which structure management data units such as a linked list and an array are used. M second arrays and M third arrays are created, where each of the M second arrays has a length K and each of the M third arrays is empty and has a length K, and M*K=N. Indexes of the N data units are correspondingly stored in the M second arrays, serial numbers of the M second arrays is stored in a linked list of the machine-level unit supply queue, and serial numbers of the M third arrays are stored in a linked list of the machine-level unit recycle queue.

The machine-level unit management queue refers to a queue created in the shared memory and used to supply and recycle data units for the container nodes when the data units of the container nodes are insufficient.

In the step 2.3, the container-level unit management queue is created for each of the container nodes, and thus container-level unit management queues corresponding to the container nodes are created.

Specifically, the container-level unit management queue created for each of the container nodes includes the container-level unit supply queue and the container-level unit recycle queue. Each of the container-level unit supply queues applies for one of the M second arrays for storing the index of the data unit from the machine-level unit supply queue, and each of the container-level unit recycle queues applies for one of the M empty third array from the machine-level unit recycle queue.

The container-level unit management queue refers to a queue created in the shared memory and used for the container nodes to use and recycle the data units.

Figure 3:
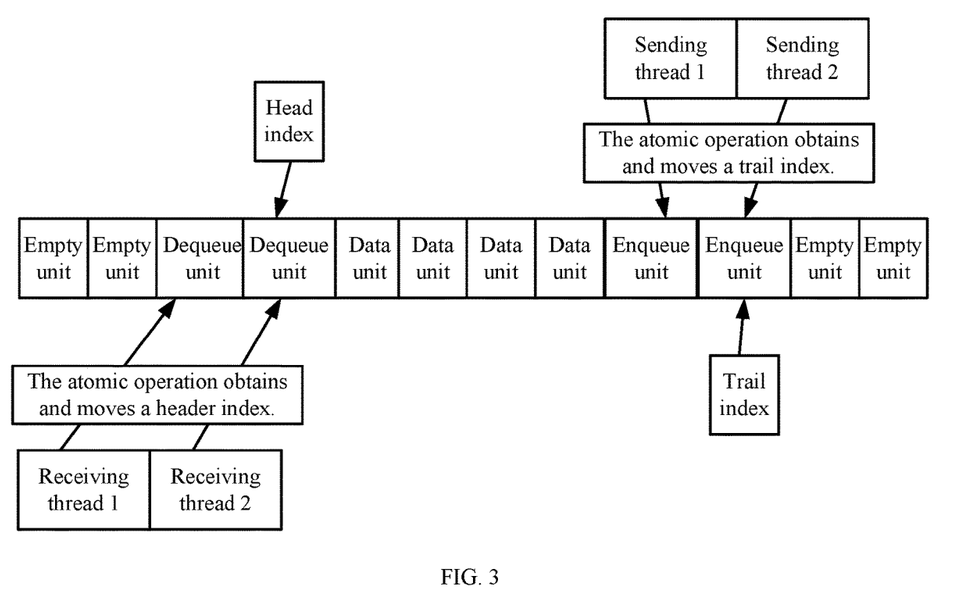
FIG. 3 illustrates a flowchart of dequeuing and enqueuing steps of a lock-free-concurrent-security output queue according to an embodiment of the present disclosure.

In the step 3, an output queue is created for each of the container nodes in the shared memory, and the output queue is lock-free, concurrent, and secure.

Specifically, according to the satellite network scenario, H lock-free-concurrent-security output queues are created for each of the container node, where H>0. The H lock-free-concurrent-security output queues are used to simulate packet transmission on links between each satellite and H satellites adjacent to the satellite. Each of the output queues is created on the shared memory and consists of a header index, a tail index and a fourth array. The header index and the tail index indicate a storage range of valid data in the output queue in the fourth array.

The lock-free-concurrent-security output queue refers to a multi-input-multi-output queue created in the shared memory to realize multi-thread packet transmission between the container nodes.

In the step 4, an output queue registry is created in each of the container nodes. The output queue registry is used to store information of one or more output queues corresponding to one or more other container nodes that required to be received and processed by the container node. The output queue registry includes an output queue quantity, an output queue serial number used to uniquely mark a corresponding output queue, and an enqueue packet count.

Specifically, before a source container node sends a packet to another container node through the output queue of the source container node, the source container node first stores an output queue serial number of the output queue of the source container node in the output queue registry of the another container node, then set an update time of the output queue of the source container node to a current time, and update the quantity of registered output queues in the output queue registry of the another container node.

Figure 4:
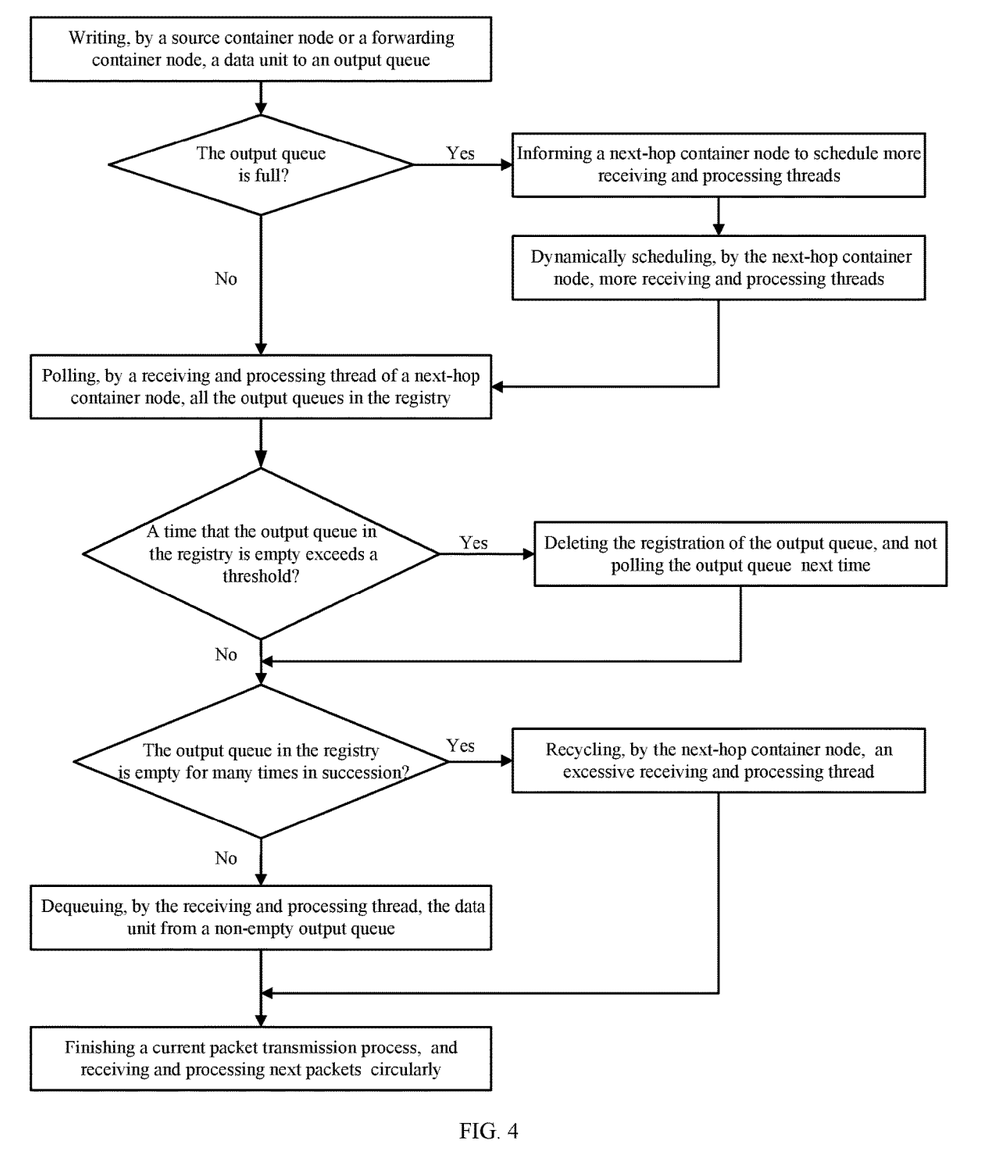
FIG. 4 illustrates a flowchart of a process of dynamically adjusting a processing thread number according to a packet flow strength of an output queue according to an embodiment of the present disclosure.

In the step 5, each of the container nodes allocates and manages a dynamic thread according to a task. The step 5 includes steps 5.1, 5.2 and 5.3.

In a step 5.1, an idle thread management queue is created by each of the container nodes.

Specifically, each of the container nodes uses a linked list to create an idle thread management queue, and stores information of the dynamic thread of the container node in a linked list element of the linked list. The information of the dynamic thread includes a thread number of the dynamic thread, a state of the dynamic thread, and a function pointer of the dynamic thread.

The dynamic thread refers to a thread created in the container node and is used to dynamically execute the task of the container node. The thread number of the dynamic thread is a unique serial number of the dynamic thread, and the container node is capable of destroying the dynamic thread thereof through the thread number of the container node. The state of the dynamic thread refers to a program execution state of the dynamic thread. The function pointer of the dynamic thread refers to a pointer variable pointing to a function and is used to provide a task execution entry for the dynamic thread.

In the step 5.2, the dynamic thread is created in the container node according to the task allocated by the container node.

Specifically, each of the container nodes sets a finite state machine in the dynamic thread of the container node to divide the state of the dynamic thread into an idle state and a task execution state. When the dynamic thread is not executing a task, the state of the dynamic thread is switched to the idle state and the dynamic thread enters blocking sleep, and the dynamic thread is an idle dynamic thread; while when the dynamic thread is executing a task, the state of the dynamic thread is switched to the task execution state and the dynamic thread executes the task allocated by the container node through the function pointer of the dynamic thread, and the dynamic thread is a task-execution dynamic thread.

In the step 5.3, each of the container node dynamically adjusts a quantity of the dynamic thread of the container node.

Specifically, each of the container nodes sets a maximum number of idle dynamic threads, and creates the maximum number of idle dynamic threads in advance. When a new task arrives, the container node allocates the new task to one idle dynamic thread. When all the dynamic threads in the container node are task-execution dynamic threads, the container node creates one idle dynamic thread. When a quantity of the idle dynamic threads in the container node is greater than the maximum number of idle dynamic threads, the container node destroys a redundant idle dynamic thread.

In the step 6, a packet is sent by the source container node to a destination container node, and whether there is no data unit in a container-level unit supply queue of the source container node is determined. The step 6 includes steps 6.1, 6.2, and 6.3.

In the step 6.1, the source container node sends the packet to the destination container node. In this process, the packet is forwarded through a forwarding container node, and the packet is transmitted between container nodes by output queues.

In the step 6.2, the source container node applies for a data unit from the container-level unit supply queue of the source container node.

In the step 6.3, whether there is a data unit in the container-level unit supply queue of the source container node is determined, if so, the step 8 is performed; otherwise, the step 7 is performed.

In the step 7, when there is no data unit in the container-level unit supply queue of the source container node, the source container node obtains a group of data unit from the machine-level unit management queue, supplements the group of data unit to the container-level unit supply queue of the source container node, and obtains the data unit from the container-level unit supply queue of the source container node. The step 7 includes steps 7.1, 7.2, and 7.3.

In the step 7.1, the source container node obtains a serial number of an empty array in which data units are completely used in the container-level unit supply queue of the source container node, uses an atomic operation to make the serial number of the empty array as a new linked list tail of the machine-level unit recycle queue, and sets a subsequent node of an original linked list tail of the machine-level unit recycle queue as the new linked list tail of the machine-level unit recycle queue.

The atomic operation refers to one operation or a series of operations that is/are inseparable and capable of being not be interrupted by any other task or event before the one operation or the series of operations is/or finished.

In the step 7.2, the source container node obtains an array serial number stored in a linked list head of the machine-level unit supply queue using the atomic operation, and sets a subsequent node of the linked list head of the machine-level unit supply queue as a new linked list head of the machine-level unit supply queue.

In the step 7.3, the source container node allocates an array filled with indexes of valid data units to the container-level unit supply queue of the source container node according to the obtained array serial number.

In the step 8, when there is a data unit in the container-level unit supply queue of the source container node, the source container node obtains the data unit from the container-level unit supply queue of the source container node and fills the packet into the obtained data unit. The step 8 includes steps 8.1 and 8.2.

In the step 8.1, the source container node obtains an index of the obtained data unit from the container-level unit supply queue of the source container node, and finds an address of the obtained data unit in the shared memory according to the index of the obtained data unit.

In the step 8.2, the source container node fills the obtained data unit with simulation parameter information, custom data frame header information, and actual transmitted data. The simulation parameter information at least includes a data transmission start time, a source container node serial number, and a destination container node serial number.

In the step 9, each of the container nodes generates a forwarding table, and the source container node or the forwarding container node determines an output queue according to the corresponding generated forwarding table. The step 9 includes steps 9.1, 9.2, and 9.3.

In the step 9.1, the source container node or the forwarding container node generates the forwarding table through querying a routing protocol, and determines a next-hop container node for arriving to the destination container node according to the forwarding table.

In the step 9.2, the source container node or the forwarding container node determines the output queue connected to the next-hop container node according to the determined next-hop container node.

In the step 9.3, the source container node or the forwarding container node registers the output queue connected to the next-hop container node in an output queue registry of the next-hop container node before sending the packet.

In the step 10, the next-hop container node allocates a dynamic thread for receiving and processing the packet. The step 10 includes steps 10.1 and 10.2.

In the step 10.1, the source container node or the forwarding container node informs the next-hop container node to allocate the dynamic thread to receive the packet from the output queue connected to the next-hop container node and process the packet.

After the output queue connected to the next-hop container node is registered in the output queue registry of the next-hop container node by the source container node or the forwarding container node, whether the next-hop forwarding container node has a dynamic thread for receiving and processing the packet that is determined first, and then after it is determined that the next-hop forwarding container node does not have a dynamic thread for receiving and processing the packet, the next-hop forwarding container node is informed to obtain an idle dynamic thread and allocate a task for receiving and processing the packet to the idle dynamic thread.

In the step 10.2, the idle dynamic thread of the next-hop container node for receiving and processing the packet obtains the output queue by polling the output queue registry of the next-hop container node, and receives the packet from the determined output queue and processes the received packet.

The polling refers that a program periodically performs loop detection in sequence.

In the step 11, the source container node or the forwarding container node stores an index of the obtained data unit for storing the packet into the determined output queue, and whether the determined output queue is full that is determined. If the determined output queue is full, the step 12 is performed, otherwise, the index of the data unit for storing the packet is written into a position of the determined output queue pointed by an enqueue index of the dynamic thread of the next-hop container node, and an enqueue packet count of the determined output queue is increased by 1, and the step 13 is performed.

In the step 11.1, the source container node or the forwarding container node determines a position where the packet is stored in the determined output queue by the atomic operation.

Specifically, the source container node or the forwarding container node performs the atomic operation, to obtain a tail index of the determined output queue and use the tail index of the determined output queue as the enqueue index of the dynamic thread of the next-hop container node, and update the tail index of the determined output queue by adding 1. When there is another thread in the source container node or the forwarding container node for sending the packet to the determined output queue, the updated tail index of the determined output queue is also used as an enqueue index of the other thread through atomic operation, and the updated tail index of the determined output queue is increased by 1, which ensures that the enqueue index of the other thread is 1 more than the enqueue index of the dynamic thread of the next-hop container node. Therefore, an enqueue index of a later executed thread is one more than an enqueue index of a previously executed thread before, so that there will be no conflict of writing positions when multiple threads sending packets to the determined output queue.

In the step 11.2, the source container node or the forwarding container node determines whether the determined output queue is full by comparing the enqueue index of the dynamic thread of the next-hop container node with a head index of the determined output queue. If it is determined that the determined output queue is full, the step 12 is performed, otherwise, the index of the data unit for storing the packet is written into the position of the determined output queue pointed by the enqueue index of the dynamic thread of the next-hop container node, and the enqueue packet count of the determined output queue is increased by 1, and the step 13 is further performed.

In the step 12, the source container node or the forwarding container node informs the next-hop container node to dynamically schedule multiple threads for receiving and processing the packet. The step 12 includes steps 12.1 and 12.2.

In the step 12.1, the source container node or the forwarding container node sends a signal to the next-hop container node, and the signal is configured to inform the next-hop container node to increase receiving and processing capacity.

In the step 12.2, after the signal is received by the next-hop container node, the next-hop container node obtains one idle dynamic thread from an idle thread management queue of the next-hop container node, allocates a task for receiving and processing the packet to the one idle dynamic thread, and enhances the ability of dequeuing packet from the determined output queue in the registry.

In the step 13, the next-hop container node obtains the packet in the data unit from the determined output queue. The step 13 includes steps 13.1, 13.2, and 13.3.

In the step 13.1, the next-hop container node determines a position of the packet taken out from the determined output queue.

Specifically, the next-hop container node performs the atomic operation, to obtain the head index of the determined output queue and use the head index of the determined output queue as a dequeue index of the dynamic thread of the next-hop container node, and update the head index of the determined output queue by adding 1. When there is another dynamic thread for dequeuing the packet from the determined output queue in the next-hop container node, the updated head index of the determined output queue is also used as a dequeue index of the multiple dynamic threads through the atomic operation, and the updated head index of the determined output queue is further increased by 1, which ensures that the dequeue index of the other thread is 1 more than the dequeue index of the dynamic thread of the next-hop container node. Therefore, a dequeue index of a later executed thread is one more than a dequeue index of a previously executed thread before, so that there will be no conflict when multiple threads are used to dequeuer the packet from the determined output queue, and realizes lock-free-concurrent-security dequeue.

In the step 13.2, the next-hop container node checks whether the determined output queue is empty by comparing the dequeue index of the dynamic thread of the next-hop container node with the tail index of the determined output queue. If the determined output queue is empty, the step 14 is performed, otherwise, the index of the data unit for storing the packet is read from a position of the determined output queue pointed by the dequeue index of the dynamic thread.

In the step 13.3, the next-hop container node looks up the destination container node serial number contained in the simulation parameter information in the data unit, and compares the destination container node serial number with a serial number of the next-hop container node to determine whether the next-hop container node is the destination container node, if so, the step 15 is performed, otherwise, the step 9 is performed.

In the step 14, the next-hop container node logs off registration information of the determined output queue, after it is determined that stream interruption is caused on the determined output queue. The step 14 includes steps 14.1, 14.2, and 14.3.

In the step 14.1, the next-hop container node determines whether stream interruption is caused on the determined output queue by polling whether the enqueue packet count of the determined output queue in the output queue registry of the next-hop container node changes. Specifically, the dynamic thread of the next-hop container node sets a polling threshold for determined whether stream interruption is caused on the determined output queue, and if it is determined that an not-updated time of the enqueue packet count of the determined output queue exceeds the polling threshold, the step 14.2 is performed; otherwise, the step 14.3 is performed.

In the step 14.2, the next-hop container node deletes information of the determined output queue which is determined that stream interruption is caused on the determined output queue in the output queue registry of the next-hop container node, and the determined output queue is no longer polled by the dynamic thread of the next-hop container node next time.

In the step 14.3, the next-hop container node recycles an excessive thread when packet receiving and processing capability of the next-hop container node is high enough. Specifically, when the dynamic thread of the next-hop container node polls the output queue registry of the next-hop container node, if it is determined that there is no output queue on which stream interruption is caused for many times, it is determined that other dynamic threads of the next-hop container node have met the capacity of receiving all output queues in the output queue registry of the next-hop container node, and the dynamic thread of the next-hop container node is recycled to the idle thread management queue of the next-hop container node.

In the step 15, the destination container node determines whether a container-level unit recycle queue of the destination container node is full. The step 15 includes steps 15.1 and 15.2.

In the step 15.1, the destination container node recycles the index of the recycled data unit into the container-level unit recycle queue.

In step 15.2, whether the container-level unit recycle queue is full that is determined, if so, the step 16 is performed; otherwise, the step 17 is performed.

In the step 16, the destination container node recycle the data unit and supplements the recycled data unit to the machine-level unit management queue. The step 16 includes steps 16.1, 16.2, and 16.3.

In the step 16.1, the destination container node obtains a serial number of an array of a container-level unit recycle queue of the destination container node in which data units are filled, and uses the serial number of the array as a new linked list tail of the machine-level unit supply queue using the atomic operation, and sets a subsequent node of an original linked list tail of the machine-level unit supply queue as the new linked list tail of the machine-level unit management queue.

In the step 16.2, the destination container node obtains an array serial number stored in a linked list head of the machine-level unit recycle queue of the destination container node using the atomic operation, and sets a subsequent node of the linked list head of the machine-level unit recycle queue as a new linked list head of the machine-level unit recycle queue.

In the step 16.3, the destination container node allocates an empty array to the container-level unit recycle queue of the destination container node according to the obtained serial number.

In the step 17, a transmission process on the data unit is finished, and a transmission process is performed on next data unit in a circulating manner, until all data units are processed.

Firstly, in the present disclosure, since the thread is dynamically allocated, which can overcomes the shortage of using independent processing threads for packet transmission and processing of each communication link between network nodes in the related art, thereby not only ensuring the effectiveness of packet transmission and processing by the network nodes, but also reducing the occupation of memory resources of a network simulation system and improving the overall performance of the network simulation system.

Secondly, in the present disclosure, since the number of the threads is dynamically adjusted according to a packet stream strength, fewer threads are used to process low-load services on multiple transmission links, thereby solving the problem in the related art that the network nodes use independent processing threads for each low-load packet stream and thus the inter-thread switching overhead is increased, so that the present disclosure reduces the processing overhead of the CPU on the low-load services.

Thirdly, improving the transmission and processing efficiency of packets by the network nodes on the premise of ensuring the concurrent security of multiple traffic flows is the key to improving the performance of network simulation system. Because the present disclosure uses packet transmission mechanism based on data units, the data units are created in an initialization stage of program operation, and a simulation process does not need to use dynamic memory allocation, recycle and copying mechanisms; what is actually transmitted between container node is a descriptor of the data unit, which does not involve the copy of data in the data unit, thus improving the transmission and processing speed of packets. The lock-free-concurrent-security output queues can overcome the deficiency of the related art that the mutual exclusion the threads of the container node leads to insufficient throughput of the network simulation system, so that the present disclosure improves the throughput of the network simulation system.

Fourthly, in the present disclosure, a container-level data unit supplement and recycle mechanism is adopted, which can support multiple container nodes to simultaneously generate and destroy data units, and improve the parallel processing capability of the network simulation system. Further, a machine-level data unit supplement and recycle mechanism is adopted, which can adjust and balance the imbalance of resources of the data units between the container nodes caused by traffic flow transmission, and thus ensures the long-term and high-speed simulation of the network simulation system.

It should be understood by those skilled in the art that embodiments of the present disclosure can be provided as methods, systems or computer program products. Therefore, the present disclosure may take the form of an entirely hardware embodiment, an entirely software embodiment, or an embodiment combining software and hardware aspects. Furthermore, the present disclosure may take the form of a computer program product embodied on one or more computer usable storage media (including but not limited to disk memory, CD-ROM, optical memory, etc.) having computer usable program code embodied therein.

In the description of the disclosure, the terms "first" and "second" are merely used for descriptive purposes, and cannot be understood as indicating or implying relative importance or implicitly indicating the number of indicated technical features. Therefore, the features defined as "first" and "second" may include one or more of these features explicitly or implicitly. In the description of the present disclosure, "multiple" means two or more, unless otherwise specifically defined.

In the description of this specification, the descriptions referring to terms "one embodiment", "some embodiments", "examples", "specific examples" or "some examples" mean that the specific features, structures, materials or characteristic data points described in connection with the embodiment or example are included in at least one embodiment or example of the present disclosure. In this specification, the schematic expressions of the above terms do not necessarily refer to the same embodiment or example.

In addition, those skilled in the art can join and combine different embodiments or examples described in this specification. The above is a further detailed description of the present disclosure combined with specific preferred embodiments, and it cannot be considered that the specific implementation of the present disclosure is merely limited to these descriptions. For ordinary technicians in the technical field to which the present disclosure belongs, on the premise of not departing from the concept of the present disclosure, a number of simple deductions or substitutions can be made, all of which should be regarded as belonging to the scope of protection of the present disclosure.

What is claimed is:

1. A network node simulation method based on Linux container, comprising:

step 1, creating each of container nodes in a satellite network scenario;

step 2, creating a data unit for packet transmission between the container nodes in a shared memory of a physical machine, and creating container-level unit management queues respectively corresponding to the container nodes and a machine-level unit management queue in the shared memory of the physical machine, wherein the machine-level unit management queue comprises a machine-level unit supply queue and a machine-level unit recycle queue, and each of the container-level unit management queues comprises a container-level unit supply queue and a container-level unit recycle queue;

step 3, creating an output queue for each of the container nodes in the shared memory, wherein the output queue is lock-free, concurrent, and secure;

step 4, creating an output queue registry in each of the container nodes, wherein the output queue registry is configured to store information of one or more output queues corresponding to one or more other container nodes that required to be received and processed by the container node, and the output queue registry comprises an output queue quantity, an output queue serial number used to uniquely mark a corresponding output queue, and an enqueue packet count;

step 5, allocating and managing, by each of the container nodes, a first dynamic thread according to a task;

step 6, sending, by a source container node, a packet to a destination container node, and determining whether there is a data unit in a container-level unit supply queue of the source container node;

step 7, in a situation that there is no data unit in the container-level unit supply queue of the source container node, obtaining, by the source container node, a data unit from the machine-level unit management queue, supplementing the obtained data unit to the container-level unit supply queue of the source container node;

step 8, in a situation that there is a data unit in the container-level unit supply queue of the source container node, obtaining, by the source container node, a data unit from the container-level unit supply queue of the source container node and filling a packet into the obtained data unit;

step 9, generating, by each of the container nodes, a forwarding table, and determining a target output queue, by the source container node or a forwarding container node according to the corresponding generated forwarding table;

step 10, allocating, by a next-hop container node, a second dynamic thread for receiving and processing the packet;

step 11, storing, by the source container node or the forwarding container node, an index of the obtained data unit for storing the packet into the target output queue, and determining whether the target output queue is full;

step 12, in a situation that the target output queue is full, informing, by the source container node or the forwarding container node, the next-hop container node to dynamically schedule multiple threads for receiving and processing the packet;

step 13, in a situation that the target output queue is not full, writing, by the source container node or the forwarding container node, the index of the obtained data unit for storing the packet into a position of the target output queue pointed by an enqueue index, and increasing an enqueue packet count of the target output queue by 1; and obtaining, by the next-hop container node, the packet from the obtained data unit of the target output queue, wherein the step 13 comprises steps 13.1, 13.2, and 13.3:

step 13.1, determining, by the next-hop container node, a position of the packet taken out from the target output queue;

step 13.2, checking, by the next-hop container node, whether the target output queue is empty by comparing a dequeue index with a tail index of the target output queue, performing step 14, in a situation that the target output queue is empty; and reading the index of the obtained data unit for storing the packet from a position of the target output queue pointed by the dequeue index, in a situation that the target output queue is not empty; and step 13.3, looking up, by the next-hop container node, a destination container node serial number contained in simulation parameter information in the obtained data unit, comparing the destination container node serial number with a serial number of the next-hop container node to determine whether the next-hop container node is the destination container node, performing step 15 in a situation that the next-hop container node is the destination container node, and performing step 9 in a situation that the next-hop container node is the destination container node;

step 14, logging off, by the next-hop container node, registration information of the target output queue, after it is determined that stream interruption is caused on the target output queue;

step 15, determining, by the destination container node, a container-level unit recycle queue of the destination container node is full;

step 16, in a situation that the container-level unit recycle queue of the destination container node is full, recycling, by the destination container node, the data unit and supplementing the recycled data unit to the machine-level unit management queue;

step 17, in a situation that the container-level unit recycle queue of the destination container node is not full, finishing a transmission process on the data unit, and performing a transmission process on next data unit in a circulating manner, until all data units are processed.

2. The network node simulation method based on Linux container according to claim 1, wherein the step 1 comprises steps 1.1, and 1.2:

step 1.1, creating a container according to a configuration of the satellite network scenario; and step 1.2, loading simulation processes of the container nodes in the container, to complete the creating of each of the container nodes in the satellite network scenario.

3. The network node simulation method based on Linux container according to claim 1, wherein the step 2 comprises steps 2.1, 2.2, and 2.3:

step 2.1, creating a first array for packet transmission between the container nodes in the shared memory of the physical machine, wherein the first array has a length of N includes N data units having a fixed size, and N>0;

step 2.2, creating the machine-level unit management queue in the shared memory of the physical machine, creating M second arrays and M third arrays, each of the M second arrays has a length K and each of the M third arrays is empty and has a length K, and M*K=N, storing indexes of the N data units correspondingly in the M second arrays, storing serial numbers of the M second arrays in a linked list of the machine-level unit supply queue, and storing serial numbers of the M third arrays in a linked list of the machine-level unit recycle queue;

step 2.3, creating the container-level unit management queue for each of the container nodes to creating container-level unit management queues corresponding to the container nodes, wherein each of the container-level unit supply queues applies for one of the M second arrays for storing the index of the data unit from the machine-level unit supply queue, and each of the container-level unit recycle queues applies for one of the M empty third array from the machine-level unit recycle queue.

4. The network node simulation method based on Linux container according to claim 1, wherein the step 3 comprises:

creating, according to the satellite network scenario, H lock-free-concurrent-security output queues for each of the container node, where H>0;

wherein the H lock-free-concurrent-security output queues are configured to simulate packet transmission on links between each satellite and/satellites adjacent to the satellite, each of the H lock-free-concurrent-security output queues is created on the shared memory and consists of a header index, a tail index and a fourth array, and the header index and the tail index indicate a storage range of valid data in the lock-free-concurrent-security output queue in the fourth array.

5. The network node simulation method based on Linux container according to claim 1, wherein the step 4 comprises:

before sending the packet to another container node through the output queue of the source container node, storing, by the source container node, an output queue serial number of the output queue of the source container node in an output queue registry of the another container node, setting an update time of the output queue of the source container node to a current time, and updating the output queue quantity in the output queue registry of the another container node.

6. The network node simulation method based on Linux container according to claim 1, wherein the step 5 comprises steps 5.1, 5.2, and 5.3:

step 5.1, creating, by each of the container nodes, an idle thread management queue using a linked list, and storing information of the first dynamic thread of the container node in a linked list element of the linked list, wherein the information of the first dynamic thread comprises a thread number of the first dynamic thread, a state of the first dynamic thread, and a function pointer of the first dynamic thread;

step 5.2, setting, by each of the container nodes, a finite state machine in the first dynamic thread of the container node to divide the state of the first dynamic thread into an idle state and a task execution state, wherein in a situation that the first dynamic thread is not executing the task, the state of the first dynamic thread is switched to the idle state and the first dynamic thread enters blocking sleep, and the first dynamic thread is an idle dynamic thread; in a situation that the first dynamic thread is executing the task, the state of the first dynamic thread is switched to the task execution state and the first dynamic thread executes the task allocated by the container node through the function pointer of the first dynamic thread, and the first dynamic thread is a task-execution dynamic thread;

step 5.3, setting, by each of the container nodes, a maximum number of idle dynamic threads, and creating the maximum number of idle dynamic threads in advance; allocating, by the container node, a new task to one idle dynamic thread of the maximum number of idle dynamic threads after the new task arrives; in a situation that all first dynamic threads in the container node are task-execution dynamic threads, creating, by the container node, one idle dynamic thread; and in a situation that a quantity of the idle dynamic threads in the container node is greater than the maximum number of idle dynamic threads, destroying, by the container node, a redundant idle dynamic thread.

7. The network node simulation method based on Linux container according to claim 1, wherein the step 6 comprises steps 6.1, 6.2, and 6.3:

step 6.1, sending, by the source container node, the packet to the destination container node, wherein the packet is forwarded through the forwarding container node, and the packet is transmitted between container nodes by output queues;

step 6.2, applying, by the source container node, for acquiring a data unit from the corresponding the container-level unit supply queue of the source container node; and step 6.3, determining whether there is a data unit in the container-level unit supply queue of the source container node; performing the step 8, in a situation that there is a data unit in the container-level unit supply queue of the source container node; and performing the step 7, in a situation that there is no a data unit in the container-level unit supply queue of the source container node.

8. The network node simulation method based on Linux container according to claim 1, wherein the step 7 comprises steps 7.1, 7.2, and 7.3:

step 7.1, obtaining, by the source container node, a serial number of an empty array in which data units are completely used in the container-level unit supply queue of the source container node, using an atomic operation to make the serial number of the empty array as a new linked list tail of the machine-level unit recycle queue, and setting a subsequent node of an original linked list tail of the machine-level unit recycle queue as the new linked list tail of the machine-level unit recycle queue;

step 7.2, obtaining, by the source container node, an array serial number stored in a linked list head of the machine-level unit supply queue using the atomic operation, and setting a subsequent node of the linked list head of the machine-level unit supply queue as a new linked list head of the machine-level unit supply queue;

step 7.3, allocating, by the source container node, an array filled with indexes of valid data units to the container-level unit supply queue of the source container node according to the obtained array serial number.

9. The network node simulation method based on Linux container according to claim 1, wherein the step 8 comprises steps 8.1 and 8.2:

step 8.1, obtaining, by the source container node, an index of the obtained data unit from the container-level unit supply queue of the source container node, and finding an address of the obtained data unit in the shared memory according to the index of the obtained data unit;

step 8.2, filling, by the source container node, the obtained data unit with simulation parameter information, custom data frame header information, and actual transmitted data, wherein the simulation parameter information comprises: a data transmission start time, a source container node serial number, and a destination container node serial number.

10. The network node simulation method based on Linux container according to claim 1, wherein the step 9 comprises steps 9.1, 9.2, and 9.3:

step 9.1, generating, by the source container node or the forwarding container node, the forwarding table through querying a routing protocol, and determining the next-hop container node for arriving to the destination container node according to the forwarding table;

step 9.2, determining, by the source container node or the forwarding container node, the target output queue connected to the next-hop container node according to the determined next-hop container node;

step 9.3, registering, by the source container node or the forwarding container node, the target output queue connected to the next-hop container node in an output queue registry of the next-hop container node before sending the packet.

11. The network node simulation method based on Linux container according to claim 1, wherein the step 10 comprises steps 10.1 and 10.2:

step 10.1, informing, by the source container node or the forwarding container node, the next-hop container node to allocate the second dynamic thread to receive the packet from the target output queue connected to the next-hop container node and process the packet; and step 10.2, obtaining, by the second dynamic thread of the next-hop container node for receiving and processing the packet, the target output queue by polling an output queue registry of the next-hop container node, and receiving the packet from the target output queue and processing the received packet.

12. The network node simulation method based on Linux container according to claim 1, wherein the step 11 comprises steps 11.1 and 11.2:

step 11.1, determining, by the source container node or the forwarding container node, a position where the packet is stored in the target output queue by the atomic operation; and step 11.2, determining, by the source container node or the forwarding container node, whether the target output queue is full by comparing the enqueue index with a head index of the target output queue.

13. The network node simulation method based on Linux container according to claim 1, wherein the step 12 comprises steps 12.1 and 12.2:
- step 12.1, sending, by the source container node or the forwarding container node, a signal to the next-hop container node, wherein the signal is configured to inform the next-hop container node to increase receiving and processing capacity; and
- step 12.2, upon receiving the signal, obtaining, by the next-hop container node, one idle dynamic thread from an idle thread management queue of the next-hop container node, allocating a task for receiving and processing the packet to the one idle dynamic thread, and enhancing the ability of dequeuing packet from the target output queue in the output queue registry.

14. The network node simulation method based on Linux container according to claim 1, wherein the step 14 comprises steps 14.1, 14.2, and 14.3:
- step 14.1, determining, by the next-hop container node, whether stream interruption is caused on the target output queue by polling whether the enqueue packet count of the target output queue in an output queue registry of the next-hop container node changes, which specifically comprises: setting, by the second dynamic thread of the next-hop container node, a polling threshold for determined whether stream interruption is caused on the target output queue; performing step 14.2, in a situation that an not-updated time of the enqueue packet count of the target output queue exceeds the polling threshold; and performing step 14.3, in a situation that an not-updated time of the enqueue packet count of the target output queue does not exceed the polling threshold;
- step 14.2, deleting, by the next-hop container node, information of the target output queue that is determined that stream interruption is caused on the target output queue in the output queue registry of the next-hop container node, wherein the target output queue is no longer polled by the second dynamic thread of the next-hop container node next time;
- step 14.3, recycling, by the next-hop container node, an excessive thread when packet receiving and processing capability of the next-hop container node is high enough, which specifically comprises: when the second dynamic thread of the next-hop container node polls the output queue registry of the next-hop container node, if it is determined that there is no output queue on which stream interruption is caused for many times, determining that other dynamic threads of the next-hop container node have met the capacity of receiving all output queues in the output queue registry of the next-hop container node, and recycling the second dynamic thread of the next-hop container node to an idle thread management queue of the next-hop container node.

15. The network node simulation method based on Linux container according to claim 1, wherein the step 15 comprises steps 15.1 and 15.2:
- step 15.1, recycling, by the destination container node, the index of the received data unit into the container-level unit recycle queue of the destination container node;
- step 15.2, determining whether the container-level unit recycle queue of the destination container node is full; performing the step 16, in a situation the container-level unit recycle queue of the destination container node is full; and performing the step 17, in a situation the container-level unit recycle queue of the destination container node is not full.

16. The network node simulation method based on Linux container according to claim 1, wherein the step 16 comprises steps 16.1, 16.2, and 16.3:
- step 16.1, obtaining, by the destination container node, a serial number of an array of the container-level unit recycle queue of the destination container node in which data units are filled, and using the serial number of the array as a new linked list tail of the machine-level unit supply queue using the atomic operation, and setting a subsequent node of an original linked list tail of the machine-level unit supply queue as the new linked list tail of the machine-level unit management queue;
- step 16.2, obtaining, by the destination container node, an array serial number stored in a linked list head of the machine-level unit recycle queue of the destination container node using the atomic operation, and setting a subsequent node of the linked list head of the machine-level unit recycle queue as a new linked list head of the machine-level unit recycle queue;
- step 16.3, allocating, by the destination container node, an empty array to the container-level unit recycle queue of the destination container node according to the obtained serial number.

* * * * *